(12) United States Patent
Kometani et al.

(10) Patent No.: US 8,736,131 B2
(45) Date of Patent: May 27, 2014

(54) DYNAMOELECTRIC MACHINE WITH NOISE REDUCTION

(75) Inventors: Haruyuki Kometani, Chiyoda-ku (JP);
Toshiaki Kashihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1348 days.

(21) Appl. No.: 12/093,737

(22) PCT Filed: Feb. 1, 2006

(86) PCT No.: PCT/JP2006/301646
§ 371 (c)(1),
(2), (4) Date: May 15, 2008

(87) PCT Pub. No.: WO2007/088598
PCT Pub. Date: Aug. 9, 2007

(65) Prior Publication Data
US 2009/0267440 A1    Oct. 29, 2009

(51) Int. Cl.
*H02K 3/28*    (2006.01)

(52) U.S. Cl.
USPC .......................................................... 310/198

(58) Field of Classification Search
USPC ................... 310/198, 184–188, 195
IPC ........................................................ H02K 3/28
See application file for complete search history.

(56) References Cited

U.S. PATENT DOCUMENTS

| | | | |
|---|---|---|---|
| 1,711,979 A * | 5/1929 | Weinert ........................ | 310/202 |
| 4,307,311 A * | 12/1981 | Grozinger .................... | 310/179 |
| 5,122,705 A | 6/1992 | Kusase et al. | |
| 5,686,774 A * | 11/1997 | Slavik et al. .................. | 310/198 |
| 6,424,073 B1 * | 7/2002 | Kometani et al. ............. | 310/180 |
| 6,433,456 B1 * | 8/2002 | Higashino et al. ............ | 310/184 |
| 6,784,583 B2 | 8/2004 | Umeda | |
| 2002/0113515 A1 * | 8/2002 | Umeda ......................... | 310/184 |
| 2004/0150284 A1 | 8/2004 | Umeda | |

FOREIGN PATENT DOCUMENTS

| | | |
|---|---|---|
| JP | 54-039805 A | 3/1979 |
| JP | 04-008140 A | 1/1992 |
| JP | 2001-238374 A | 8/2001 |
| JP | 2001-251823 A | 9/2001 |
| JP | 2002-247787 A | 8/2002 |
| JP | 2005-287109 A | 10/2004 |

* cited by examiner

*Primary Examiner* — Burton Mullins
*Assistant Examiner* — Michael Andrews
(74) *Attorney, Agent, or Firm* — Sughrue Mion, PLLC; Richard C. Turner

(57) ABSTRACT

The present invention provides a dynamoelectric machine that can reduce 12f vibrational force and suppress generation of irritating electromagnetic noise in a vicinity of 2,000 Hz in an idling state. In the present invention, an armature winding includes first and second three-phase windings, the first three-phase winding is configured by delta-connecting respective phase windings, and the second three-phase winding is configured so as to be Y-connected to the first three-phase winding by connecting respective phase windings in series to respective output ends of the first three-phase winding. The first and second three-phase windings are each installed in the stator core such that respective phase currents have a phase difference from each other. In addition, angles between center lines of adjacent slot opening portions of the stator core central angles of adjacent slot opening portions of the stator have a nonuniform pitch, and a turn ratio between the first three-phase winding and the second three-phase winding is within a range of 1.25 to 2.25.

4 Claims, 9 Drawing Sheets

| U phase | X phase | V phase | Y phase | W phase | Z phase |
|---------|---------|---------|---------|---------|---------|
| 1 magnetic pole pitch ||||||

DYNAMOELECTRIC MACHINE WITH NOISE REDUCTION

TECHNICAL FIELD

The present invention relates to a dynamoelectric machine such as a generator, an electric motor, a generator-motor, etc., that is mounted to a passenger car, or a truck, etc.

BACKGROUND ART

In recent years, improvements in power output has been sought in automotive alternators due to increases in vehicle loads, while at the same time automotive vehicle engine compartments are becoming increasingly smaller, leaving little mounting space to spare for them. The need for noise reduction is also high, both inside and outside vehicles, and engine noise is being reduced. However, noise from automotive alternators that operate constantly to generate electric power in order to supply power for the electric loads on vehicles has become a problem. Automotive alternating-current dynamoelectric machines are operated over a comparatively wide range of rotational speeds from low speeds to high speeds and wind noise and electromagnetic noise therefrom are considered to be problems. Electromagnetic noise from automotive alternators, particularly in a region from an idling state to a normal service region in which engine speed is low, has a different frequency from that of engine noise and noise from engine auxiliary machinery, and is considered a problem because it is noticeable to human ears and is heard as an unpleasant noise.

Various techniques for reducing electromagnetic noise have been proposed conventionally in answer to needs of this kind. For example, in dynamoelectric machines having two stator slots per phase per pole, electromagnetic vibrational forces generated by harmonic magnetic flux have been reduced by making an armature winding into a wye-delta hybrid connection and forming the stator slots at a uniform angular pitch (such that a slot opening portion pitch has an electrical angle of 30 degrees) to reduce harmonic magnetic flux inside the dynamoelectric machine (see Patent Literature 1, for example).

Patent Literature 1: Japanese Patent No. 3633494 (Gazette)

DISCLOSURE OF THE INVENTION

Problem to be Solved by the Invention

In the conventional dynamoelectric machine described above, if the number of turns in the delta connection divided by the number of turns in the wye connection (star connection) is made to equal $\sqrt{3}$, a spatial fifth-order magnetomotive force harmonic and a spatial seventh-order magnetomotive force harmonic inside the dynamoelectric machine theoretically become zero, and electromagnetic vibrational force generated as a result thereof (called "6f vibrational force", where f is a fundamental frequency) disappears. Here, it is physically necessary for the number of turns in the winding to be an integer, making it difficult to make the number of turns in the delta connection divided by the number of turns in the wye connection equal $\sqrt{3}$. For this reason, it is necessary to make this turn ratio approach $\sqrt{3}$. Moreover, a spatial eleventh-order magnetomotive force harmonic and a spatial thirteenth-order magnetomotive force harmonic that are generated inside the dynamoelectric machine are not reduced even in that case. For this reason, electromagnetic vibrational force generated by these harmonics (called "12f vibrational force") is not reduced even if a wye-delta hybrid connection is used.

During high-speed operation of a vehicle, on the other hand, even if electromagnetic noise from an automotive alternator or generator-motor does happen to increase in a high-speed region, the noise will not be irritating for the user since most of the noise will be wind noise or engine noise. In other words, the solution required in dynamoelectric machines is reduction of the electromagnetic noise generated during low-speed operation. Specifically, electromagnetic noise in a vicinity of 2,000 Hz generated when the vehicle is stationary (i.e., in an idling state) constitutes the most irritating noise.

Engine speed in the idling state is approximately 700 rpm, and since the ratio between a crank pulley of the engine and a pulley of the automotive alternator is approximately 2 to 2.5, rotational speed of an automotive alternator in the idling state is approximately 1,500 to 1,800 rpm. If the number of poles in the automotive alternator is twelve, then the fundamental frequency is 150 to 180 Hz, and if the number of poles is sixteen, the fundamental frequency is 200 to 240 Hz. Thus, the frequency of the 6f vibrational force is 900 to 1,080 Hz in the case of twelve poles, and 1,200 to 1,440 Hz in the case of sixteen poles. In contrast to that, the frequency of the 12f vibrational force is 1,800 to 2,160 Hz in the case of twelve poles, and 2,400 to 2,880 Hz in the case of sixteen poles.

Thus, it can be seen that irritating electromagnetic noise in a vicinity of 2,000 Hz in the idling state is generated by the 12f vibrational force. However, although the spatial fifth-order harmonic and the spatial seventh-order harmonic can be reduced by conventional dynamoelectric machines, the spatial eleventh-order magnetomotive force harmonic and the spatial thirteenth-order magnetomotive force harmonic (the 12f vibrational force) cannot be reduced because the armature winding is constituted by a wye-delta hybrid connection, and one problem has been that the generation of the irritating electromagnetic noise in the vicinity of 2,000 Hz in the idling state could not be suppressed.

The present invention aims to solve the above problems and an object of the present invention is to provide a dynamoelectric machine that can reduce 12f vibrational force and suppress generation of irritating electromagnetic noise in a vicinity of 2,000 Hz in an idling state.

Means for Solving the Problem

In order to achieve the above object, according to one aspect of the present invention, there is provided a dynamoelectric machine including a stator that includes: a stator core; and an armature winding that is mounted to the stator core, the dynamoelectric machine being characterized in that: the armature winding includes a plurality of three-phase windings; a delta-connected three-phase winding is configured by delta-connecting respective phase windings of one of the three-phase windings; and a wye-connected three-phase winding is configured by connecting respective phase windings of a remainder of the three-phase windings in series to respective output ends of the delta-connected three-phase winding. The plurality of three-phase windings are each installed in the stator core such that respective phase currents have a phase difference from each other. In addition, angels between center lines of adjacent slot opening portions of the stator core have a nonuniform pitch, and a turn ratio between the delta-connected three-phase winding and the wye-connected three-phase winding is within a range of 1.25 to 2.25.

Effects of the Invention

According to the present invention, because the armature winding is configured by wye-delta hybrid connecting a plurality of three-phase windings, fifth-order harmonic components and seventh-order harmonic components of reactive magnetomotive force in the stator, which constitute a major cause of magnetic noise, can be made to cancel each other out. Because the angels between center lines of the adjacent slot opening portions are made to have a nonuniform pitch, 12f vibrational force is reduced, suppressing the generation of irritating electromagnetic noise in the vicinity of an idling state. In addition, because a single set of full-wave rectifying circuits is sufficient, the size of the apparatus can be reduced.

BEST MODE FOR CARRYING OUT THE INVENTION

Embodiment 1

Figure 1:
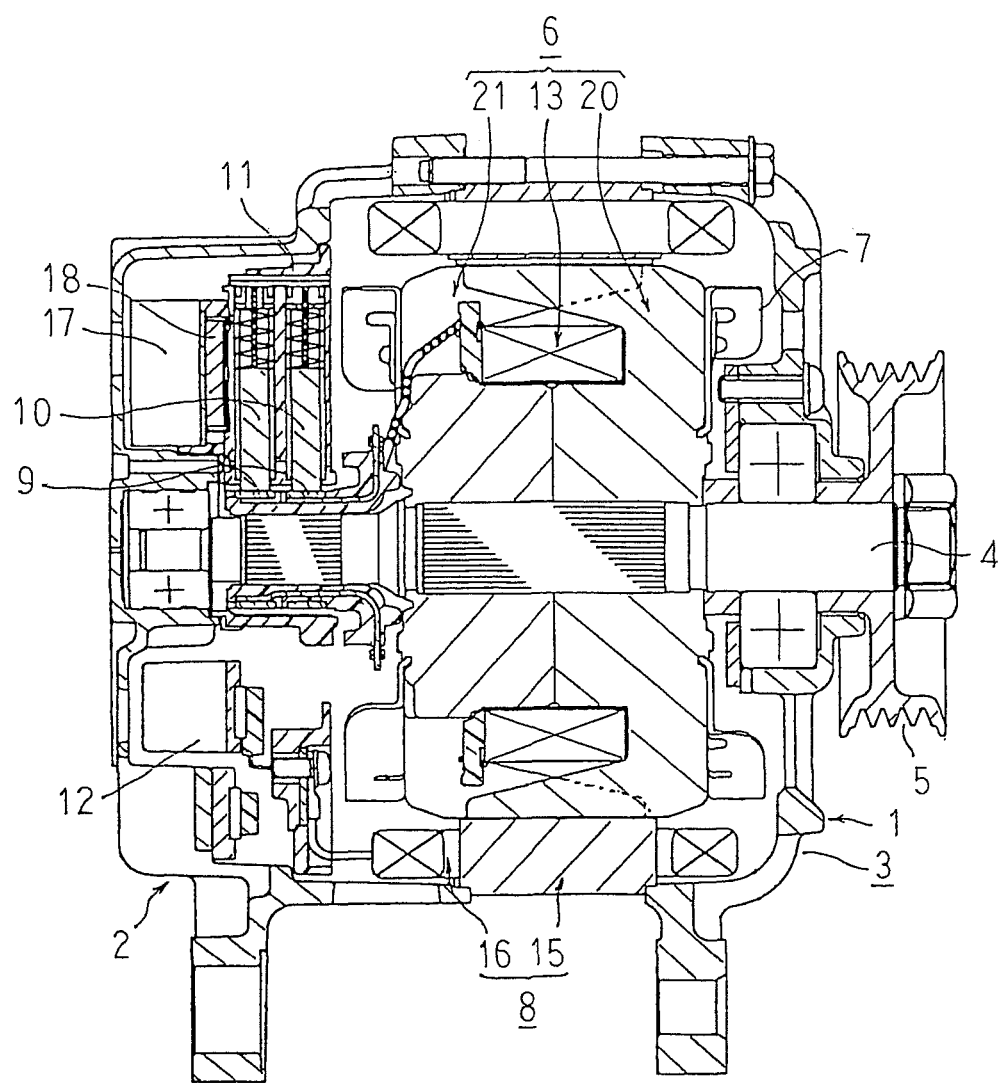
FIG. 1 It is a longitudinal section showing an automotive alternator according to Embodiment 1 of the present invention.
Figure 2:
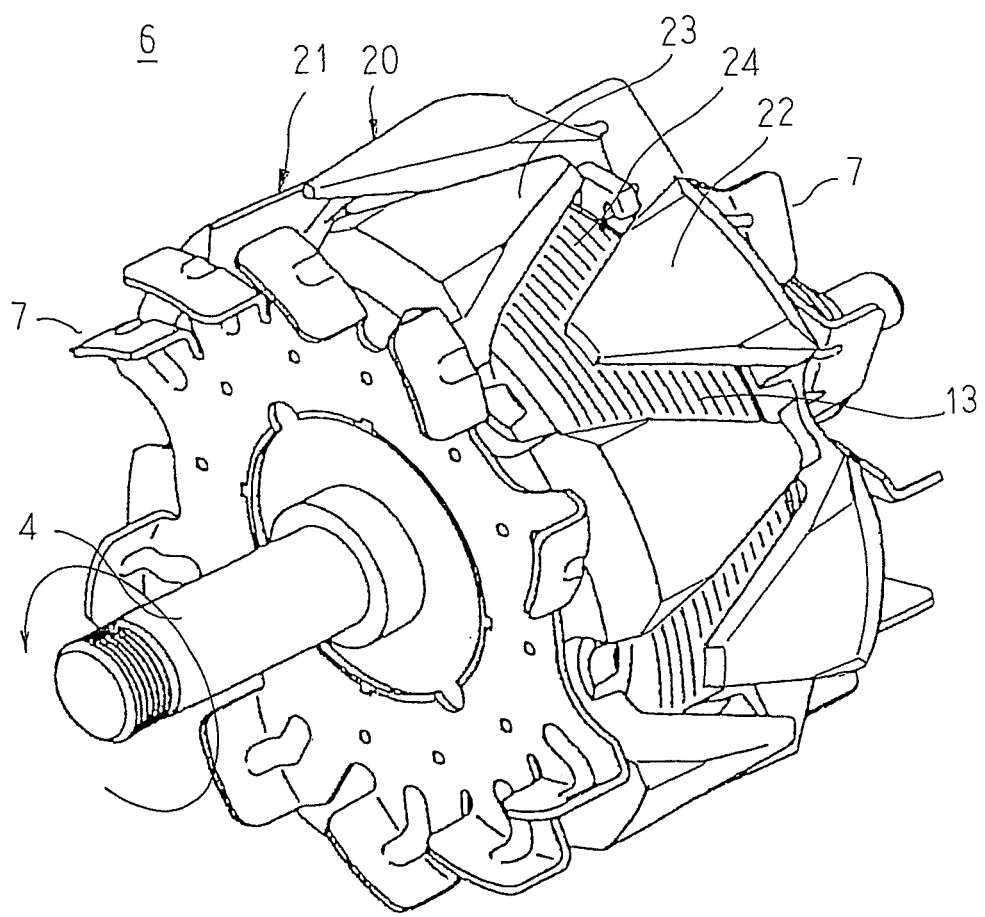
FIG. 2 It is a perspective showing a rotor in the automotive alternator according to Embodiment 1 of the present invention.
Figure 3:
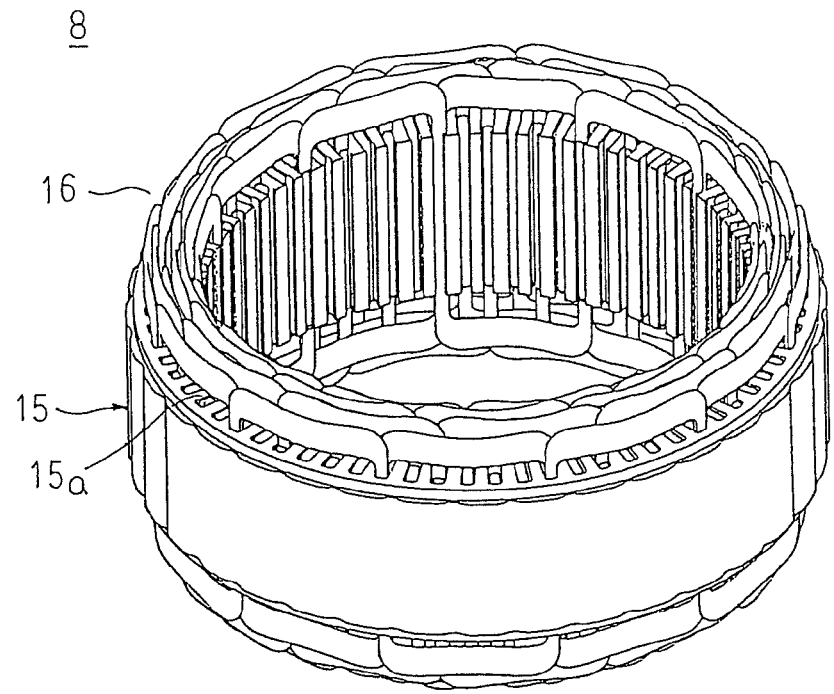
FIG. 3 It is a perspective showing a stator in the automotive alternator according to Embodiment 1 of the present invention.
Figure 4:
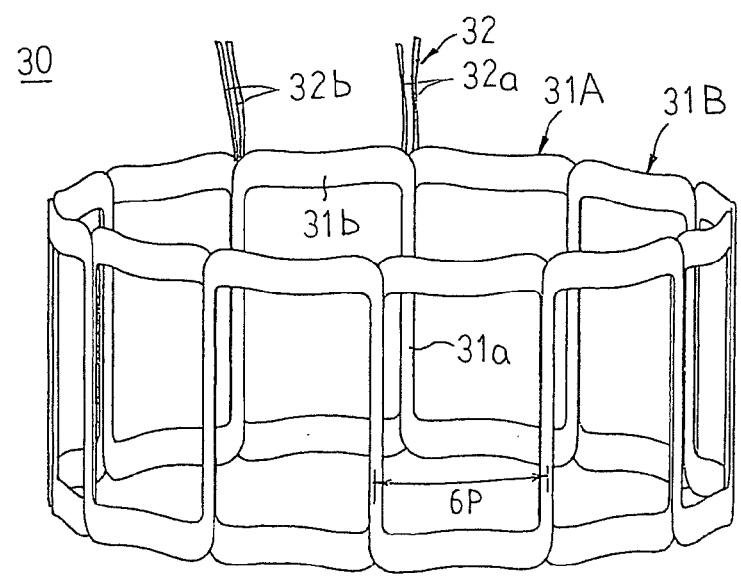
FIG. 4 It is a perspective explaining a configuration of an armature winding in the automotive alternator according to Embodiment 1 of the present invention.
Figure 5:
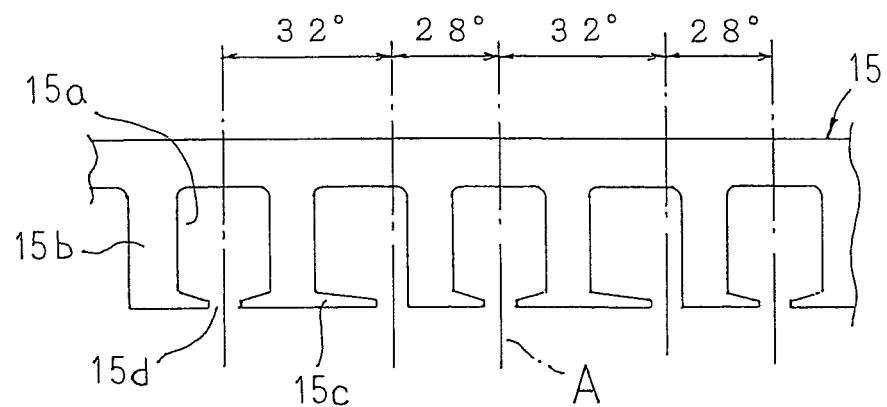
FIG. 5 It is a partial end elevation explaining a configuration of a stator core in the automotive alternator according to Embodiment 1 of the present invention.
Figure 6:
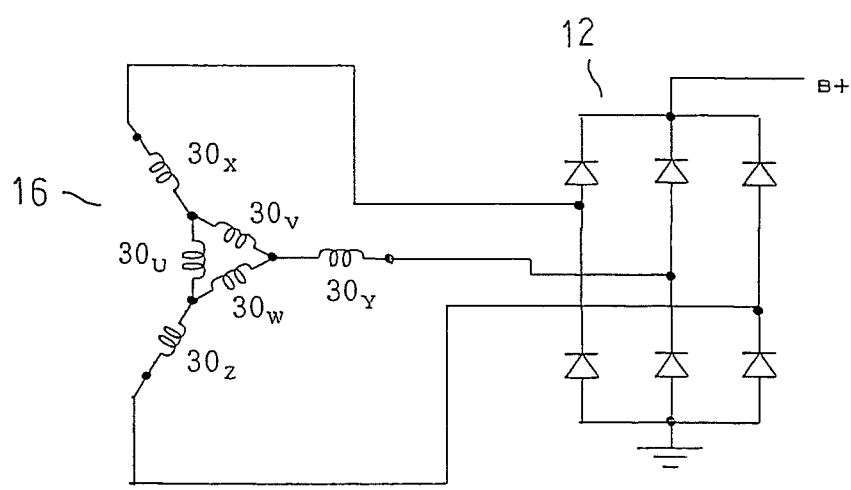
FIG. 6 It is an electrical circuit diagram for the automotive alternator according to Embodiment 1 of the present invention.

FIG. 1 is a longitudinal section showing an automotive alternator according to Embodiment 1 of the present invention, FIG. 2 is a perspective showing a rotor in the automotive alternator according to Embodiment 1 of the present invention, FIG. 3 is a perspective showing a stator in the automotive alternator according to Embodiment 1 of the present invention, FIG. 4 is a perspective explaining a configuration of an armature winding in the automotive alternator according to Embodiment 1 of the present invention, FIG. 5 is a partial end elevation explaining a configuration of a stator core in the automotive alternator according to Embodiment 1 of the present invention, and FIG. 6 is an electrical circuit diagram for the automotive alternator according to Embodiment 1 of the present invention.

In FIGS. 1 through 4, an automotive alternator (hereinafter abbreviated to "alternator") includes: a case 3 that is constituted by a front bracket 1 and a rear bracket 2 that are made of aluminum and are each generally bowl-shaped; a shaft 4 that is rotatably supported by the case 3; a pulley 5 that is fixed to an end portion of the shaft 4 that projects outward at a front end of the case 3; a rotor 6 that is fixed to the shaft 4 and accommodated inside the case 3; fans 7 that are fixed to first and second axial end surfaces of the rotor 6; a stator 8 that is fixed to an inner wall surface of the case 3 so as to surround the rotor 6; slip rings 9 that are fixed to a rear end of the shaft 4 so as to supply electric current to the rotor 6; a pair of brushes 10 that are disposed inside the case 3 so as to slide on the slip rings 9; a brush holder 11 that houses the brushes 10; a rectifier 12 that is electrically connected to the stator 8 so as to convert alternating current generated in the stator 8 into direct current; a heat sink 17 that is mounted to the brush holder 11; and a regulator 18 that is bonded to the heat sink 17 and adjusts magnitude of alternating voltage generated in the stator 8.

The rotor 6 includes: a field winding 13 that generates magnetic flux on passage of electric current; and a pair of first and second pole core bodies 20 and 21 that are disposed so as to cover the field winding 13 and in which magnetic poles being formed by the magnetic flux therefrom. The first and second pole core bodies 20 and 21 are made of iron and have six claw-shaped magnetic poles 22 and 23, respectively, that are disposed on an outer edge portion at a uniform angular pitch circumferentially so as to project axially, and are fixed to the shaft 4 facing each other such that the claw-shaped magnetic poles 20 and 21 intermesh. A gap 24 is formed between the adjacent claw-shaped magnetic poles 22 and 23 so as to prevent the magnetic flux from leaking out between the claw-shaped magnetic poles 22 and 23. This gap 24 also functions as a cooling airflow passage for cooling the field winding 13.

The stator 8 includes: a cylindrical stator core 15; and an armature winding 16 that is mounted to the stator core 15.

Slots 15a that extend axially are disposed on the stator core 15 at a uniform angular pitch circumferentially at a ratio of two slots per phase per pole such that slot opening portions 15d face inward. In other words, in Embodiment 1, since the total number of claw-shaped magnetic poles 22 and 23 is twelve, seventy-two slots 15a (slots 15a from Slot Number 1 through Number 72) are formed on the stator core 15. As shown in FIG. 5, the slots 15a are formed such that a length of circumferential projection of flange portions 15c that are formed on tip ends of teeth 15b is changed such that angles between center lines A of adjacent slot opening portions 15d repeatedly alternate between mechanical angles of 5.33 degrees and 4.67 degrees. Moreover, the center lines A are straight lines joining centers of circumferential widths of the slot opening portions 15d and a central axis of the stator core 15, and the mechanical angles 5.33 degrees and 4.67 degrees correspond to electrical angles of 32 degrees and 28 degrees, respectively. In other words, the slot opening portions 15d of the stator core 15 are formed at a nonuniform pitch so as to alternate between electrical angles of 32 degrees and 28 degrees.

The armature winding 16 is constituted by six phase windings 30. Each of the phase windings 30 is constituted by first and second wave windings 31A and 31B. As shown in FIG. 4, each of the wave windings 31A and 31B is configured by winding a conductor wire 32 that is constituted by a copper wire material having a circular cross section that is coated with an electrical insulator for a predetermined number of winds into a wave-shaped pattern constituted by: slot-housed portions 31a that are arranged at a pitch of six slots; and crossover portions 31b that link end portions of adjacent slot-housed portions 31a to each other alternately in an axial direction. The first and second wave windings 31A and 31B are stacked so as to be offset circumferentially by a pitch of six slots, and a winding end 32b of the first wave winding 31A and a winding end 32b of the second wave winding 31B are joined together to constitute a phase winding 30. As shown in FIG. 3, the phase windings 30 configured in this manner are installed in the stator core 15 such that the slot-housed portions 31a are stacked radially and are housed inside each of the slots 15a. The crossover portions 31b are disposed so as to face each other axially with the stator core 15 interposed.

The six phase windings 30 are respectively installed in a first slot group that is constituted by Slot Numbers 1, 7, etc., through 67, a second slot group that is constituted by Slot Numbers 2, 8, etc., through 68, a third slot group that is constituted by Slot Numbers 3, 9, etc., through 69, a fourth slot group that is constituted by Slot Numbers 4, 10, etc., through 70, a fifth slot group that is constituted by Slot Numbers 5, 11, etc., through 71, and a sixth slot group that is constituted by Slot Numbers 6, 12, etc., through 72. Here, for convenience, the phase windings 30 that are installed in the first through sixth slot groups will be designated U, X, V, Y, W, and Z phase windings $30_U$, $30_X$, $30_V$, $30_Y$, $30_W$, and $30_Z$, respectively.

Moreover, a first three-phase winding that is constituted by the U, V, and W phase windings $30_U$, $30_V$, and $30_W$ that are installed in the first, third, and fifth slot groups and a second three-phase winding that is constituted by the X, Y, and Z phase windings $30_X$, $30_Y$, and $30_Z$ that are installed in the second, fourth, and sixth slot groups have a phase difference corresponding to an electrical angle of 32 degrees. The U, V, and W phase windings $30_U$, $30_V$, and $30_W$ have a phase difference corresponding to an electrical angle of 60 degrees, and the X, Y, and Z phase windings $30_X$, $30_Y$, and $30_Z$ have a phase difference corresponding to an electrical angle of 60 degrees.

A winding start 32a of the first wave winding 31A of the U phase winding $30_U$ and a winding start 32a of the second wave winding 31B of the V phase winding $30_V$ are joined together, a winding start 32a of the first wave winding 31A of the V phase winding $30_V$ and a winding start 32a of the second wave winding 31B of the W phase winding $30_W$ are joined together, and a winding start 32a of the first wave winding 31A of the W phase winding $30_W$ and a winding start 32a of the second wave winding 31B of the U phase winding $30_U$ are joined together. The U, V, and W phase windings $30_U$, $30_V$, and $30_W$ are thereby delta-connected to constitute the first three-phase winding.

A winding start 32a of the second wave winding 31B of the X phase winding $30_X$ is joined to the joint portion between the U phase winding $30_U$ and the V phase winding $30_V$, a winding start 32a of the second wave winding 31B of the Y phase winding $30_Y$ is joined to the joint portion between the V phase winding $30_V$ and the W phase winding $30_W$, and a winding start 32a of the second wave winding 31B of the Z phase winding $30_Z$ is joined to the joint portion between the W phase winding $30_W$ and the U phase winding $30_U$. The X, Y, and Z phase windings $30_X$, $30_Y$, and $30_Z$ are thereby connected in series to output ends of the first three-phase winding so as to be wye-connected to the first three-phase winding and constitute the second three-phase winding.

Thus, as shown in FIG. 6, an armature winding 16 is obtained in which the U, X, V, Y, W, and Z phase windings $30_U$, $30_X$, $30_V$, $30_Y$, $30_W$, $30_Z$ are wye-delta hybrid connected. The winding starts 32a of the first wave windings 31A of the X, Y, and Z phase windings $30_X$, $30_Y$, and $30_Z$ are connected to the rectifier 12.

In an alternator that is configured in this manner, electric current is supplied from a battery (not shown) through the brushes 10 and the slip rings 9 to the field winding 13. Magnetic flux is thereby generated, magnetizing the claw-shaped magnetic poles 22 of the first pole core body 20 into North-seeking (N) poles, and magnetizing the claw-shaped magnetic poles 23 of the second pole core body 21 into South-seeking (S) poles. At the same time, the pulley 5 is driven to rotate by the engine, rotating the rotor 6 together with the shaft 4. A rotating magnetic field is thereby applied to the armature winding 16, generating an electromotive force. This alternating-current electromotive force passes through the rectifier 12, which is constituted by a single set of full-wave rectifying circuits, so as to be converted into direct current, and the magnitude of its voltage is also adjusted by the regulator 18, and the battery is charged.

In an alternator that is configured in this manner, the slot opening portions 15d are formed at a nonuniform pitch that alternates repeatedly between electrical angles of 32 degrees and 28 degrees, and the first three-phase winding that is constituted by the U, V, and W phase windings $30_U$, $30_V$, and $30_W$ and the second three-phase winding that is constituted by the X, Y, and Z phase windings $30_X$, $30_Y$, and $30_Z$ are installed in the stator core 15 so as to have a phase difference that has an electrical angle of 32 degrees. In addition, the turn ratio between the delta-connected first three-phase winding and the wye-connected second three-phase winding is 1.

The significance of adopting the above configuration will now be explained.

First, electromagnetic attraction is generated between the rotor 6 and the stator 8 during power generation by interaction between the rotating magnetic field including harmonics generated by the claw-shaped magnetic poles 22 and 23 of the rotor 6 and the alternating-current magnetic field including harmonics generated by the alternating current generated by the armature winding 16. This electromagnetic attraction becomes electromagnetic vibrational force in the claw-shaped magnetic poles 22 and 23 of the rotor 6 and in the stator core 15, giving rise to vibration and electromagnetic noise.

Now, when the present inventors performed electromagnetic field analysis and analyzed the above electromagnetic vibrational force in the case of an alternator in which the number of slots 15a was six times the number of magnetic poles and the armature winding 16 was configured by wye-delta hybrid connecting two three-phase windings, results were obtained that showed that the generation of electromagnetic noise in the alternator resulted from electromagnetic vibrational forces in the order of three times and six times the number of poles per revolution. In other words, it was found that the generation of electromagnetic noise results from the electromagnetic vibrational force at a 6f frequency and a 12f frequency, where f is a fundamental frequency of the output current.

Figure 7:
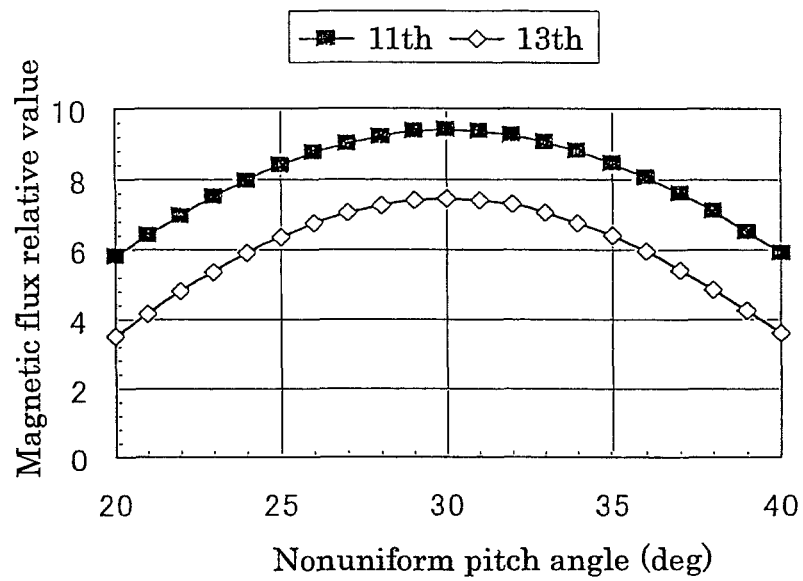
FIG. 7 It is a graph showing relationships between spatial eleventh-order and spatial thirteenth-order harmonic magnetic fluxes and nonuniform pitch angle.

The spatial eleventh-order and spatial thirteenth-order harmonic magnetic fluxes that cause the 12f vibrational force are independent of the wye-delta turn ratio, and have ratios relative to a fundamental wave inside the alternator that are constant. FIG. 7 shows relative values of magnitude of spatial eleventh-order and spatial thirteenth-order harmonic magnetic fluxes relative to nonuniform pitch angle. From FIG. 7, it can be seen that the magnetic flux is at a maximum when the pitch of the slot opening portions is a uniform pitch (at an electrical angle of 30 degrees).

Figure 8:
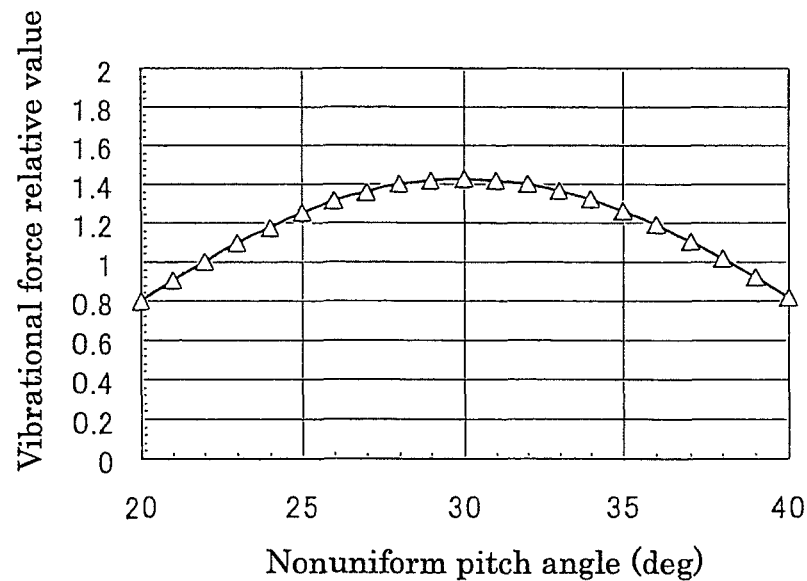
FIG. 8 It is a graph showing a relationship between 12f vibrational force and nonuniform pitch angle.

Next, relative values of magnitude of the 12f vibrational force that arises due to these spatial eleventh-order and spatial thirteenth-order magnetomotive force harmonics relative to nonuniform pitch angle are shown in FIG. 8. Here, for simplicity, the 12f vibrational force that the spatial eleventh-order magnetomotive force harmonic makes and the 12f vibrational force that the spatial thirteenth-order magnetomotive force harmonic makes are calculated on the assumption that they reinforce each other. From FIG. 8, it can be seen that the 12f vibrational force is also at a maximum when the pitch of the slot opening portions is a uniform pitch (at an electrical angle of 30 degrees).

Figure 9:
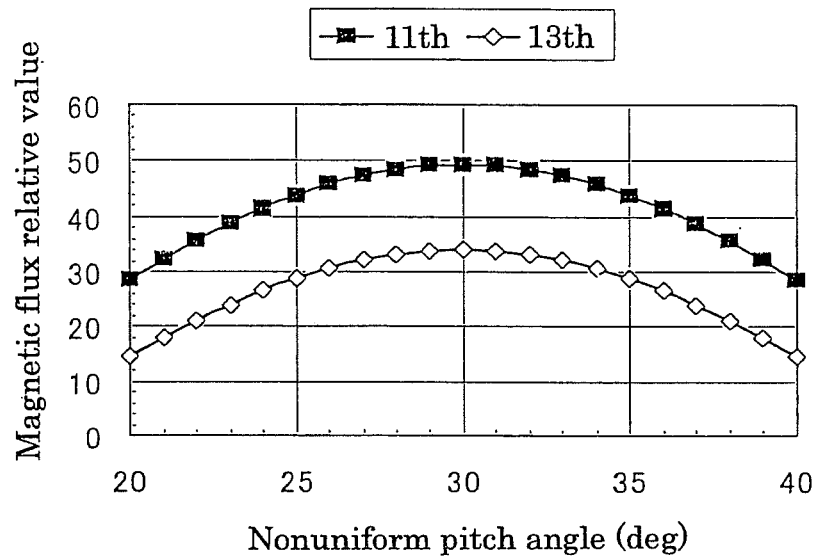
FIG. 9 It is a graph showing relationships between spatial eleventh-order and spatial thirteenth-order harmonic magnetic fluxes and nonuniform pitch angle when the influence of stator slot harmonics is taken into consideration.
Figure 10:
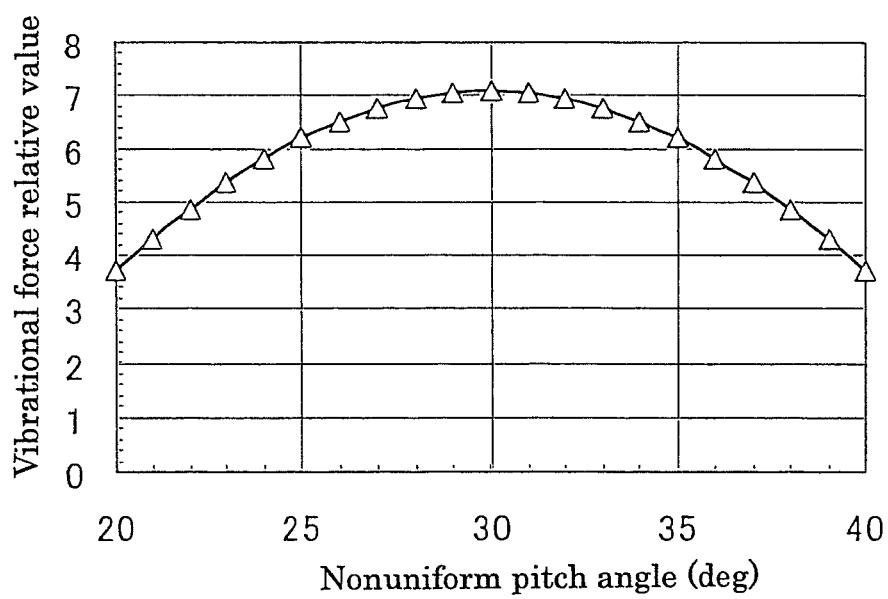
FIG. 10 It is a graph showing a relationship between 12f vibrational force and nonuniform pitch angle when the influence of stator slot harmonics is taken into consideration.

Similarly, relative values of magnitude of the spatial eleventh-order and spatial thirteenth-order harmonic magnetic fluxes relative to nonuniform pitch angle when the influence of stator slot harmonics is taken into consideration are shown in FIG. 9. In addition, relative values of magnitude of the 12f vibrational force resulting therefrom relative to nonuniform pitch angle are shown in FIG. 10. It can be seen that the magnetic flux and the 12f vibrational force are at maxima when the pitch of the slot opening portions is a uniform pitch (at an electrical angle of 30 degrees) even if the influence of the stator slot harmonics is taken into consideration.

From these results, it can be seen that it is effective to make the pitch of the slot opening portions of the stator a nonuniform pitch in order to reduce irritating electromagnetic noise in the idling state.

Now, the 6f vibrational force is reduced greatly compared to the 12f vibrational force by using a wye-delta hybrid connection, but it is desirable for the 6f vibrational force to be reduced as much as possible from the viewpoint of electromagnetic noise. Since the 6f vibrational force changes depending on the wye-delta turn ratio and the nonuniform pitch angle in particular, the turn ratio requires attention.

Figure 11:
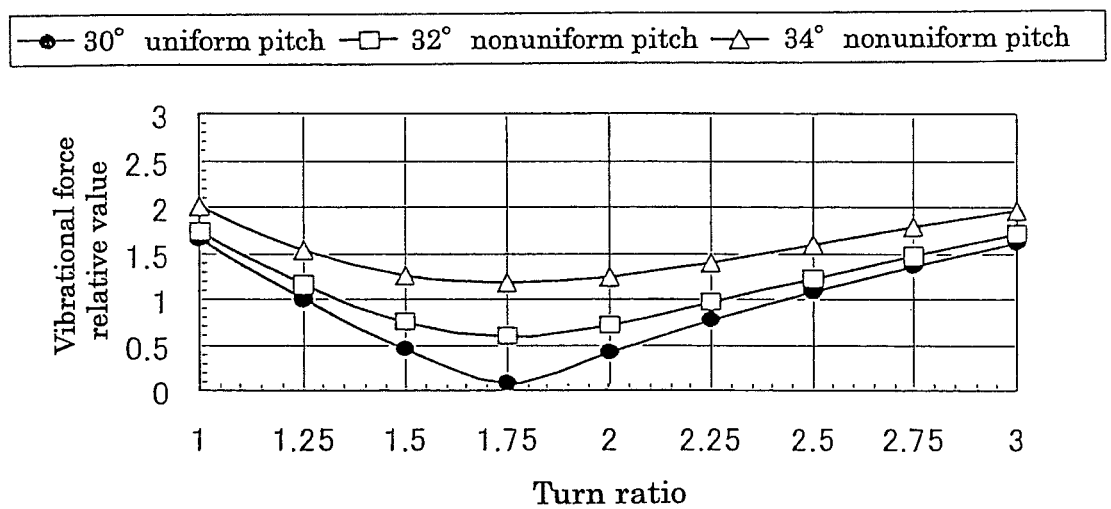
FIG. 11 It is a graph showing relationships between 6f vibrational force, turn ratio, and nonuniform pitch angle.
Figure 12:
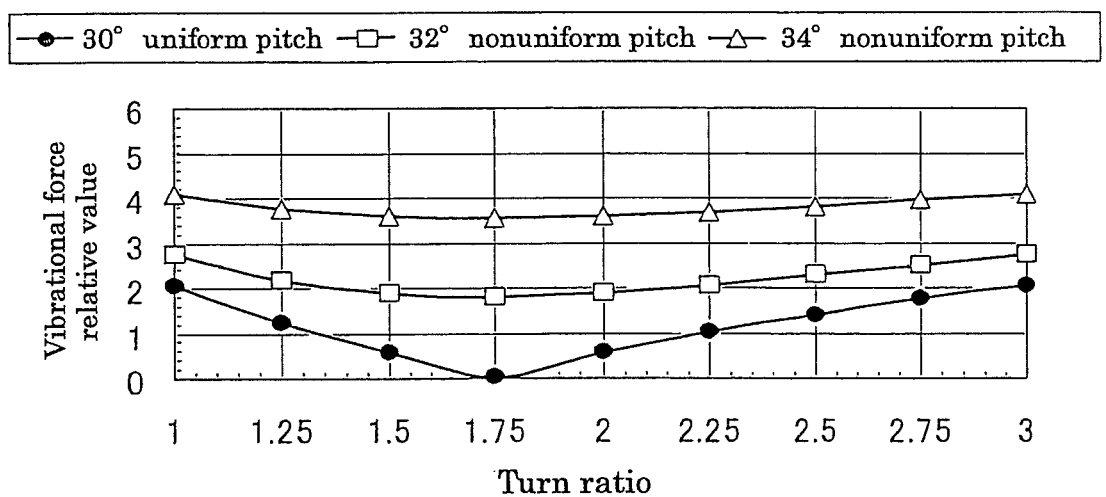
FIG. 12 It is a graph showing relationships between 6f vibrational force, turn ratio, and nonuniform pitch angle when the influence of stator slot harmonics is taken into consideration.

FIG. 11 shows the influence of turn ratio and nonuniform pitch angle on 6f vibrational force that is generated by spatial fifth-order and spatial seventh-order magnetomotive force harmonics. FIG. 12 shows the influence of turn ratio and nonuniform pitch angle on 6f vibrational force when the influence of stator slot harmonics is taken into consideration. From FIGS. 11 and 12 it can be seen that 6f vibrational force can be reduced if the number of turns in the delta winding divided by the number of turns in the wye connections (i.e., the turn ratio) is within a range of 1.25 to 2.25, irrespective of the nonuniform pitch angle.

In an alternator that is configured in this manner, the first three-phase winding is configured by delta-connecting the U, V, and W phase windings, the second three-phase winding is configured so as to be wye-connected to the first three-phase winding by connecting the X, Y, and Z phase windings in series to each of the output ends of the first three-phase winding, the slot opening portions 15d are formed at a nonuniform pitch, and the turn ratio between the first three-phase winding and the second three-phase winding is within a range of 1.25 to 2.25.

Thus, because the electromagnetic vibrational forces at the 6f frequency and the 12f frequency can be reduced even if a rectifier 12 constituted by a single set of full-wave rectifying circuits is used, generation of irritating electromagnetic noise in a vicinity of 2,000 Hz in an idling state can be suppressed, and the size of the apparatus can be reduced compared to when a rectifier constituted by two sets of full-wave rectifying circuits is used and output is combined.

Embodiment 2

Figure 13:
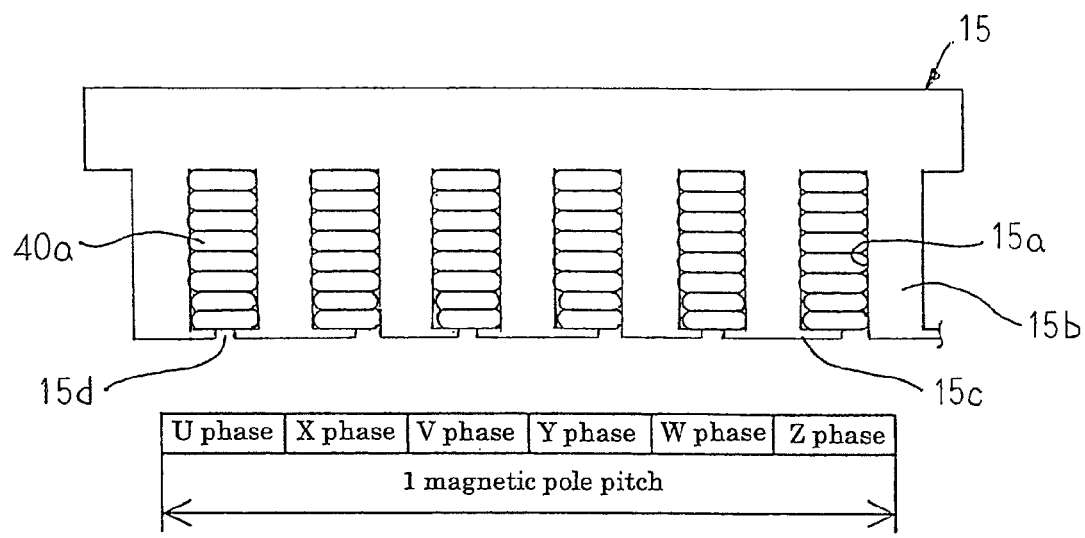
FIG. 13 It is a diagram explaining a configuration of a stator in an automotive alternator according to Embodiment 2 of the present invention.
Figure 14:
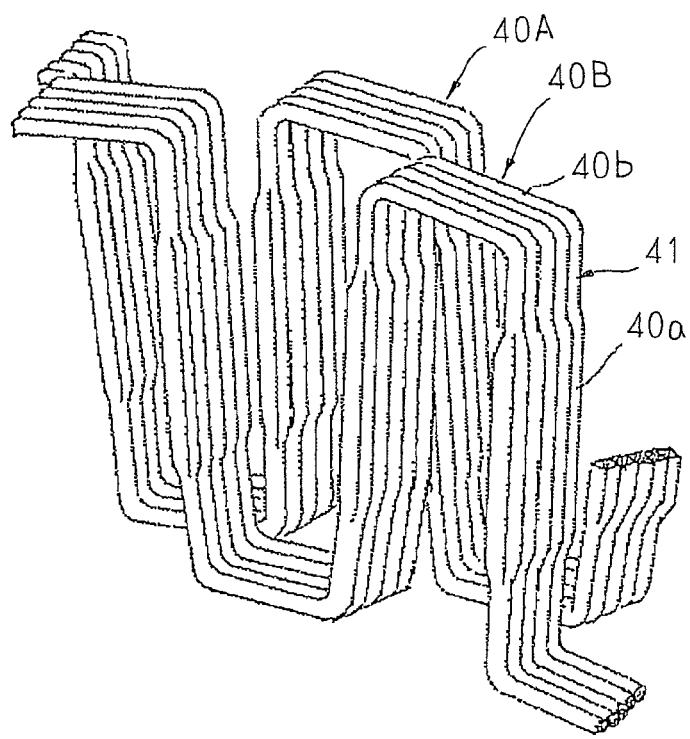
FIG. 14 It is a partial perspective explaining a configuration of an armature winding in the automotive alternator according to Embodiment 2 of the present invention.
Figure 15:
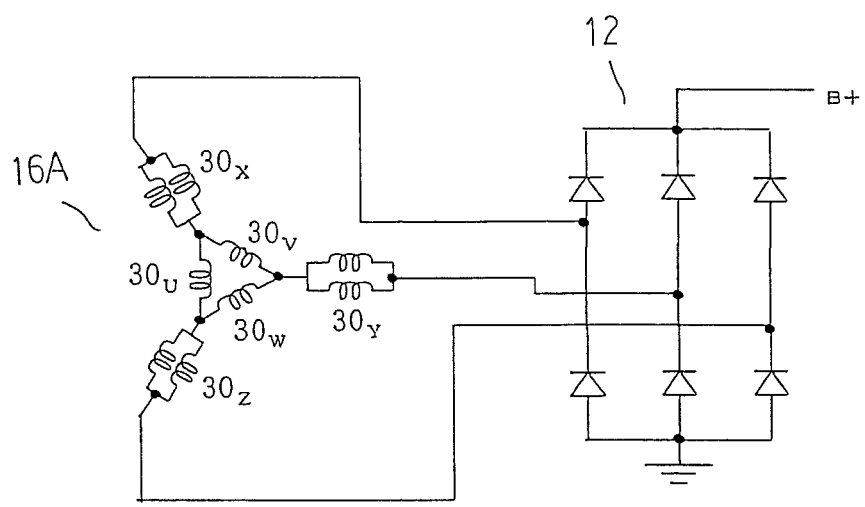
FIG. 15 It is an electrical circuit diagram for the automotive alternator according to Embodiment 2 of the present invention.

FIG. 13 is a diagram explaining a configuration of a stator in an automotive alternator according to Embodiment 2 of the present invention, FIG. 14 is a partial perspective explaining a configuration of an armature winding in the automotive alternator according to Embodiment 2 of the present invention, and FIG. 15 is an electrical circuit diagram for the automotive alternator according to Embodiment 2 of the present invention.

In FIG. 14, a phase winding 30A is constituted by first and second wave windings 40A and 40B. Except for the cross-sectional shape of the conductor wire and the number of turns, the wave windings 40A and 40B are configured in a similar manner to the wave windings 31A and 31B shown in FIG. 4. In other words, the wave windings 40A and 40B are configured by winding a conductor wire 41 that is constituted by a copper wire material that is coated with an electrical insulator for a predetermined number of winds into a wave-shaped pattern constituted by: slot-housed portions 40a that are arranged at a pitch of six slots; and crossover portions 40b that link end portions of adjacent slot-housed portions 40a to each other alternately in an axial direction. The conductor wire 41 has a circular cross section, but portions of the conductor wire are deformed into a flat rectangular cross section by press working. Specifically, the slot-housed portions 40a are made so as to have a flat rectangular cross section, and the crossover portions 40b are made so as to have a circular cross section. The wave windings 40A and 40B are installed in the stator core 15 so as to be offset circumferentially by a pitch of six slots, stacked, and housed inside each of the slots 15a.

Each of the phase windings 30A is thereby loaded inside the slots 15a, as shown in FIG. 13, such that the slot-housed portions 40a thereof are lined up in single columns of six layers radially with long sides of their rectangular cross sections aligned circumferentially. Moreover, the slot opening portions 15d are formed at a nonuniform pitch.

U, V, and W phase windings $30_U$, $30_V$, and $30_W$ are each configured into single series circuits having eight turns by joining together winding ends of the first and second wave windings 40A and 40B. On the other hand, X, Y, and Z phase windings $30_X$, $30_Y$, and $30_Z$ are each configured into two parallel circuits having four turns by joining together winding starts of the first and second wave windings 40A and 40B and also joining together winding ends of the first and second wave windings 40A and 40B.

The U, V, and W phase windings $30_U$, $30_V$, and $30_W$ are then delta-connected to constitute the first three-phase winding. The X, Y, and Z phase windings $30_X$, $30_Y$, and $30_Z$ are thereby connected in series to output ends of the first three-phase winding such that a second three-phase winding is wye-connected to the first three-phase winding.

Thus, as shown in FIG. 15, an armature winding 16A is obtained in which the U, X, V, Y, W, and Z phase windings $30_U$, $30_X$, $30_V$, $30_Y$, $30_W$, $30_Z$ are wye-delta hybrid connected. Output ends of each of the X, Y, and Z phase windings $30_X$, $30_Y$, and $30_Z$ are connected to a rectifier 12.

In Embodiment 2, because the conductor wires 41 that are loaded inside the slots 15a are equal in number in each and every slot 15a, the U, X, V, N, W, and Z phase windings $30_U$, $30_X$, $30_V$, $30_Y$, $30_W$, $30_Z$ can be produced using windings having an identical configuration, that is, using a single kind of phase winding 30A, thereby improving productivity.

Because the slot-housed portions 40a of the conductor wires 41 are made so as to have a rectangular cross-sectional shape, the inside of the slots 15a can be used effectively, that is, the space factor of the conductor wires 41 is improved, enabling compactness and high output to be achieved.

The slot opening portions 15d are formed at a nonuniform pitch that alternates repeatedly between electrical angles of 32 degrees and 28 degrees, and the first three-phase winding that is constituted by the U, V, and W phase windings $30_U$, $30_V$, and $30_W$ and the second three-phase winding that is constituted by the X, Y, and Z phase windings $30_X$, $30_Y$, and $30_Z$ are installed in the stator core 15 so as to have a phase difference that has an electrical angle of 32 degrees. In addition, because each of the phase windings of the delta-connected first three-phase winding has eight turns and each of the phase windings of the wye-connected second three-phase winding has four turns, the turn ratio between the two is 2. Consequently, in Embodiment 2, 12f vibrational force is reduced and generation of irritating electromagnetic noise in a vicinity of 2,000 Hz in an idling state can be suppressed in a similar manner to Embodiment 1 above.

Now, in a wye-delta hybrid connection, because the wye connection is connected in series to the output ends of the delta connection, the quantity of heat generated in the conductors of the wye-connected portions is √3 times the quantity of heat generated in the conductors of the delta-connected portions. Thus, if the cross-sectional area of the conductors of the wye-connected portions is made to be √3 times the cross-sectional area of the conductors of the delta-connected portions, increases in the quantity of heat generated in the conductors of the wye-connected portions can be suppressed. However, if the cross-sectional area of all of the conductor wires is equal, the cross-sectional area of the conductors in the wye-connected portions can be made to approach √3 times the cross-sectional area of the conductors in the delta-connected portions by making the wye-connected portions into seven parallel circuits and making the delta-connected portions into four parallel circuits, but the winding construction and the connecting construction become extremely complicated.

In Embodiment 2, because each of the phase windings of the delta-connected first three-phase winding is configured into a single series circuit and each of the phase windings of the wye-connected second three-phase winding is configured into two parallel circuits, the cross-sectional area of the conductors in the wye-connected portions can be made to be twice the cross-sectional area of the conductors in the delta-connected portions using conductor wires having an identical diameter and using simple connections. Thus, because the cross-sectional area of the conductors in the wye-connected portions can be made to approach √3 times the cross-sectional area of the conductors in the delta-connected portions without having to adopt complicated winding constructions and connecting constructions, productivity of the dynamoelectric machine is improved. In addition, because increases in the quantity of heat generated in the conductors of the wye-connected portions can be suppressed, the generated heat in the delta-connected portions and the wye-connected portions is made uniform, enabling temperature increases in the electrically-insulating coating of the conductor wires to be suppressed, thereby improving insulating durability.

Moreover, in Embodiment 2 above, only the slot-housed portions of the conductor wires are made so as to have a rectangular cross-sectional shape, but the whole of the conductor wires, that is, the slot-housed portions and the crossover portions, may also be made so as to have a rectangular cross-sectional shape.

In each of the above embodiments, the present invention is explained as it applies to automotive alternators, but similar effects are also exhibited if the present invention is applied to other dynamoelectric machines such as automotive generator-motors, automotive alternating-current motors, etc.

In each of the above embodiments, the present invention is explained as it applies to an automotive alternator in which the number of poles is twelve and the number of slots is seventy-two, but the number of poles and number of slots are not limited to these and, for example, the present invention may also be applied to an automotive alternator in which the number of poles is sixteen and the number of slots is ninety-six.

In each of the above embodiments, the present invention is explained as it applies to an automotive alternator in which the stator slots are made at a ratio of two slots per phase per pole, but the present invention can be applied to any automotive alternator in which the stator slots are made at a ratio of n slots per phase per pole (where n is an integer greater than or equal to 2). In that case, the armature winding will be composed of n sets of three-phase windings, one set of three-phase windings will be configured into a delta-connection, and remaining sets of three-phase windings will be connected in series to output ends of the delta-connected three-phase winding.

The invention claimed is:

1. A dynamoelectric machine comprising a stator that includes:
    a stator core; and
    an armature winding that is mounted to said stator core,
    said dynamoelectric machine comprising:
        a delta-connected three-phase winding configured by delta-connecting respective phase windings of one of said three-phase windings; and
        a wye-connected three-phase winding configured by connecting respective phase windings of a remainder of said three-phase windings in series to respective output ends of said delta-connected three-phase winding;
    wherein said plurality of three-phase windings are each installed in said stator core such that respective phase currents have a phase difference from each other,
    angles between center lines of adjacent slot opening portions of said stator core have a nonuniform pitch,
    a turn ratio between said delta-connected three-phase winding and said wye-connected three-phase winding is within a range of 1.25 to 2.25, and
    electrical conductors that are loaded inside slots are equal in number in each and every slot.

2. A dynamoelectric machine according to claim 1, wherein a turn ratio between said delta-connected three-phase winding and said wye-connected three-phase winding is 2, each of said phase windings of said delta-connected three-phase winding being configured into a single series circuit, and each of said phase windings of said wye-connected three-phase winding being configured into two parallel circuits.

3. A dynamoelectric machine according to claim 1, wherein a portion of an electrical conductor that is loaded inside a slot is made so as to have a rectangular cross-sectional shape.

4. A dynamoelectric machine according to claim 3, wherein a turn ratio between said delta-connected three-phase winding and said wye-connected three-phase winding is 2, each of said phase windings of said delta-connected three-phase winding being configured into a single series circuit, and each of said phase windings of said wye-connected three-phase winding being configured into two parallel circuits.

* * * * *